United States Patent
Carlton

(10) Patent No.: US 7,710,923 B2
(45) Date of Patent: May 4, 2010

(54) SYSTEM AND METHOD FOR IMPLEMENTING A MEDIA INDEPENDENT HANDOVER

(75) Inventor: Alan Gerald Carlton, Mineola, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/091,159

(22) Filed: Mar. 28, 2005

(65) Prior Publication Data

US 2005/0249161 A1  Nov. 10, 2005

Related U.S. Application Data

(60) Provisional application No. 60/569,015, filed on May 7, 2004.

(51) Int. Cl.
  H04W 4/00 (2009.01)
(52) U.S. Cl. .............. 370/331; 370/328; 370/329; 370/335; 370/338; 370/341; 370/342; 370/348; 370/466; 370/467; 370/469; 455/436; 455/437; 455/438; 455/439; 455/440; 455/441; 455/442; 455/552.1
(58) Field of Classification Search .......... 370/328, 370/329, 331, 335, 338, 341, 342, 348, 446, 370/467, 469; 455/436–442, 552.1
See application file for complete search history.

(56) References Cited

U.S. PATENT DOCUMENTS

| | | | |
|---|---|---|---|
| 5,889,816 A | 3/1999 | Agrawal et al. | |
| 5,946,634 A * | 8/1999 | Korpela | 455/552.1 |
| 6,393,008 B1 * | 5/2002 | Cheng et al. | 370/338 |
| 6,587,680 B1 | 7/2003 | Ala-Laurila et al. | |
| 6,651,105 B1 | 11/2003 | Bhagwat et al. | |
| 6,771,962 B2 | 8/2004 | Saifullah et al. | |
| 6,804,222 B1 | 10/2004 | Lin et al. | |
| 6,826,406 B1 | 11/2004 | Vialen et al. | |
| 6,879,568 B1 | 4/2005 | Xu et al. | |
| 6,950,655 B2 * | 9/2005 | Hunkeler | 455/426.1 |
| 6,963,745 B2 * | 11/2005 | Singh et al. | 455/437 |

(Continued)

FOREIGN PATENT DOCUMENTS

AU   2002/313192   12/2003

(Continued)

OTHER PUBLICATIONS

Kwak, Joe. "RRM Study Group: Big Picture Issues." Sep. 10, 2002. IEEE Submission, Document: IEEE 802.11-557r0.

(Continued)

Primary Examiner—William Trose, IV
Assistant Examiner—Toan D Nguyen
(74) Attorney, Agent, or Firm—Volpe and Koenig, P.C.

(57) ABSTRACT

A system for implementing a media independent handover in a station in a wireless communication system includes a physical sublayer management entity, a medium access control sublayer management entity, a management information base, and a handover policy function. The handover policy function is capable of receiving measurements and system information from the physical sublayer management entity, the medium access control sublayer management entity, and the management information base. The handover policy function is capable of then autonomously determining whether to execute a handover.

5 Claims, 6 Drawing Sheets

U.S. PATENT DOCUMENTS

| | | | |
|---|---|---|---|
| 6,985,465 B2 | 1/2006 | Cervello et al. | |
| 6,987,985 B2* | 1/2006 | Purkayastha et al. | 455/552.1 |
| 7,016,325 B2 | 3/2006 | Beasley et al. | |
| 7,031,280 B2 | 4/2006 | Segal | |
| 7,106,714 B2 | 9/2006 | Spear et al. | |
| 7,280,505 B2* | 10/2007 | Chaskar et al. | 370/331 |
| 7,483,984 B1 | 1/2009 | Jonker et al. | |
| 2002/0060995 A1 | 5/2002 | Cervello et al. | |
| 2002/0071404 A1* | 6/2002 | Park et al. | 370/331 |
| 2002/0072382 A1 | 6/2002 | Fong et al. | |
| 2002/0147008 A1 | 10/2002 | Janne | |
| 2002/0188723 A1 | 12/2002 | Choi et al. | |
| 2003/0007490 A1 | 1/2003 | Yi et al. | |
| 2003/0117978 A1 | 6/2003 | Haddad | |
| 2003/0133421 A1 | 7/2003 | Sundar et al. | |
| 2003/0139184 A1 | 7/2003 | Singh et al. | |
| 2003/0139784 A1 | 7/2003 | Singh et al. | |
| 2003/0193911 A1 | 10/2003 | Zhao et al. | |
| 2004/0002335 A1 | 1/2004 | Pan et al. | |
| 2004/0013102 A1 | 1/2004 | Fong et al. | |
| 2004/0029587 A1 | 2/2004 | Hulkkonen et al. | |
| 2004/0076179 A1* | 4/2004 | Kaminski et al. | 370/466 |
| 2004/0102194 A1 | 5/2004 | Naghian et al. | |
| 2004/0116120 A1 | 6/2004 | Gallagher et al. | |
| 2004/0147223 A1 | 7/2004 | Cho | |
| 2004/0165594 A1 | 8/2004 | Faccin et al. | |
| 2004/0192294 A1 | 9/2004 | Pan et al. | |
| 2004/0202141 A1* | 10/2004 | Sinivaara et al. | 370/338 |
| 2005/0018637 A1 | 1/2005 | Karoubalis et al. | |
| 2005/0083971 A1* | 4/2005 | Delaney et al. | 370/466 |
| 2005/0157673 A1 | 7/2005 | Verma et al. | |
| 2005/0165917 A1 | 7/2005 | Le et al. | |
| 2005/0185619 A1 | 8/2005 | Niemela et al. | |
| 2005/0243755 A1 | 11/2005 | Stephens | |
| 2006/0140150 A1 | 6/2006 | Olvera-Hernandez et al. | |
| 2006/0187882 A1 | 8/2006 | Kwak et al. | |
| 2006/0259598 A1 | 11/2006 | Kim et al. | |

FOREIGN PATENT DOCUMENTS

| | | |
|---|---|---|
| EP | 1349413 A1 | 10/2003 |
| WO | 02/23819 | 3/2002 |
| WO | 2002/023819 | 3/2002 |
| WO | 2002/23819 | 3/2002 |
| WO | 2004/014027 | 2/2004 |
| WO | 2004/077747 | 9/2004 |
| WO | 2005/057968 | 6/2005 |
| WO | 2005/107297 | 11/2005 |

OTHER PUBLICATIONS

Kwak, Joe. "RRM Study Group: Big Picture Issues." Sep. 10, 2002. IEEE Submission, Document: IEEE 802.11-557r1.

Paine, Richard. "Radio Resource Measurement Requirements and Issues." Oct. 19, 2002. IEEE Submission, Document: IEEE 802.11-02/508r10.

Kwak, Joe. "WLAN Handoff Scenarios: Example Handoffs with RRM Measurements and Network Assistance." Mar. 2003. IEEE Submission, Document: IEEE 802.11-03/225r0.

Gupta, Vivek. "IEEE P802.21 Media Independent Handover Service Draft Technical Requirements." Sep. 2004.

Sachs et al. "IEEE 802.21 Media Independent Handover—Generic Link Layer Concept." IEEE Submission, Sep. 9, 2004.

Paine, Richard. "Radio Resource Measurement Issues." Jan. 16, 2003. IEEE Submission, Document: IEEE 802.11-03/134r0.

Johnston, David. "IEEE 802 Handoff Executive Committee Study Group." May 2003. 802 Handoff ECSG Minutes.

Johnston, David. "802 Handoff Presentation to WNG." Jul. 2003. 00-30-0022-00-0000 Handoff WNG Presentation r3.

Williams, Michael Glenn. IEEE P802 Wired and Wireless LANs Handoff: Tentative Minutes of the IEEE P802 Handoff Executive Committee Study Group. Jul. 22, 2003. IEEE 802.11-03/319r0-0023.

Williams, Michael Glenn. IEEE P802 Wired and Wireless LANs Handoff: Tentative Minutes of the IEEE P802 Handoff Executive Committee Study Group. Jul. 24, 2003. IEEE 802.11-03/319r000-03-0028-00-0000.

Johnston, David. "802 Handoff ECSG EC Closing Report." Jul. 2003. IEEE 00-03-0029-04-0000 802 Handoff EC Closing Report.

Williams, Michael Glenn. IEEE P802 Wired and Wireless LANs Handoff: Tentative Minutes of the IEEE P802 Handoff Executive Committee Study Group. Sep. 8, 2003. IEEE 00-03-0032-00-0000.

Paine, Richard. "Radio Resource Measurement: 802 Handoff Measurement Considerations." Mar. 2003. IEEE 802.11-03/125r4.

Hong, Cheng. "3GPP WLAN Interworking update." Mar. 16, 2004. IEEE 802.11-04/254r0.

Park, Soohong Daniel. "Access Router Identifier (ARID) for supporting L3 mobility." Jul. 2004. IEEE 802.11-04/710r0.

Gupta, Vivek. "Global Network Neighborhood." May 2004. IEEE 802.21.

Gupta, Vivek. "Steps in Handoffs and Use Cases." May 2004. IEEE 802.21.

Park, Soohong Daniel. "Awareness of the handover to be distinguished from a L2 or L3." Mar. 2004. 21-04-0002-00-0000-awareness handover L2$L3.ppt.

Johnston, David. "802.21, L2 Triggers A Strawman Proposal." Mar. 2004. 802.21 IETF Mobopts r1.

Shyy, Dong-Jye. "IEEE P802.21 Media Independent Handover Service: Draft Technical Requirements." Mar. 18, 2004. IEEE802.21-04/00xx-00.

Williams, Michael Glenn. "IEEE P802 Wired and Wireless LANs Handoff: Tentative Minutes of the IEEE P802 Handoff Executive Committee Study Group." Jan. 13, 2004. 00-04-00XX-00-0000.

Williams, Michael Glenn. "IEEE P802 Wired and Wireless LANs Handoff: Tentative Minutes of the IEEE P802 Handoff Executive Committee Study Group." Jan. 14, 2004. 00-04-00XX-00-0000.

Williams, Michael Glenn. "IEEE P802 Wired and Wireless LANs Handoff: Tentative Minutes of the IEEE P802.21 Working Group." Mar. 18, 2004. 00-04-00XX-00-0000.

Gupta, Vivek. "Global Network Neighborhood." May 2004. IEEE 802.21.

Gupta, Vivek. "Steps in Handoffs and Use Cases." May 2004. IEEE 802.21.

Gupta, Vivek. IEEE P802.21 Media Independent Handover Mechanisms: Teleconference Meeting Minutes. Jun. 29, 2004. 21-04-0073-00-0000.

Gupta, Vivek. "IEEE P802.21 Media Independent Handover Service Draft Technical Requirements." Jul. 12, 2004. 21-04-0087-00-0000.

Faccin, Stefano M. "IEEE 802.21 Media Independent Handover." Jan. 10, 2004. 21-04-0169-03-0000.

"IEEE 802.21 MIHO: Media Independent Handover Functions and Services Specification." Mar. 14, 2004.

"IEEE 802.21 MIHO: Media Independent Handover Functions and Services Specification." Mar. 14, 2004. 21-05-0253-01-0000.

"Information technology—Telecommunications and information exchange between systems—Local and metropolitan area networks—Specific requirements—Part 11: Wireless LAN Medium Access Control (MAC) and Physical Layer (PHY) Specifications." Jun. 12, 2003. ANSI/IEEE Std 802.11, 1999 Edition (R2003).

Park, Soohong Daniel. "Awareness of the handover to be distinguished from a L2 or L3." Mar. 2004. IEEE P802.21 Handoff.

Johnston, David. "802.21 L2 Services for Handover Optimization." Mar. 2004. 802.21 IETF DNA r1.

Johnston, David. "802.21 L2 Triggers a Strawman Proposal." Mar. 2004. 802.21 IETF Mobopts r1.

Liu, Xiaoyu. Interaction between L2 and Upper Layers in IEEE 802.21. Mar. 4, 2004. 802.21 L2 Upper Layer Interaction r.

Johnston, David. "Architectural Elements of an 802 Handoff Solution." May 2003. 802 Handoff Archtecture Elements r1.

Johnston, David. "802 Handoff Call for Interest—An Expression of Interest." Mar. 2003. IEEE 802-03/xxxr1.

Williams, Michael Glenn. "IEEE P802 Wired and Wireless LANs Handoff: Tentative Minutes of the IEEE P802 Handoff Executive Committee Study Group." Nov. 10, 2003. 00-03-00XX-00-0000.

Williams, Michael Glenn. "IEEE P802 Wired and Wireless LANs Handoff: Tentative Minutes of the IEEE P802.21 Working Group." Mar. 16, 2004. 00-04-00XX-00-0000.

Williams, Michael Glenn. "IEEE P802 Wired and Wireless LANs Handoff: Tentative Minutes of the IEEE P802.21 Working Group." Mar. 18, 2004. 00-04-00XX-00-0000.

Johnston, David. "Handoff Scope Discussion Points." May 2003. 802 Handoff Scope Discussion.

Johnston, David. "Improved Stack Diagram" Mar. 12, 2003. IEEE C802.16REVd-04/XX.

Aboba, Bernard. "A Model for Context Transfer in IEEE 802." Apr. 6, 2002.

Arbaugh, William A. "Experimental Handoff Extension to Radius." Apr. 23, 2003.

Wu, Gang. "Fast handoff for Mobile IP and Link Layer Triggers." May 2003. P802-Handoff-03-xxxr0-ECSG.

Gupta, Vivek. "IEEE 802.21: A Generalized Model for Link Layer Triggers." Mar. 1, 2004.

Johnston, David. "802 Handoff ECSG EC Opening Plenary Report." Nov. 2003. 802 Handoff EC Opening Plenary Report r2.

Lin, Huai-An (Paul). "Handoff for Multi-interfaced 802 Mobile Devices." May 2003. IEEE P802 Handoff ECSG.

Lin, Huai-An (Paul). "IEEE P802 Handoff ECSG: Handoff for Multi-interfaced 802 Mobile Devices." May 12, 2003.

Kwak, Joe. "Handoff Functional Elements: An analysis of typical mobile systems." Nov. 11, 2002.

Tan, TK. "Wireless Interworking Group." Nov. 11, 2002. IEEE 802.11-xxx.

Natarajan, Nat. "Support of Layer 2 Triggers for Faster Handoffs." Nov. 10, 2003. IEEE P802.20-03/95.

Johnston, David. "IEEE 802 Handoff ECSG L2 Triggers." Jan. 2004. L2 Triggers dj r1.

Rajkumar, Ajay. "Mobile-Initiated Handoff Amongst Disparate WLAN and Cellular Systems." May 13, 2003.

Williams, Michael Glenn. "Media Independent Handover: Use Cases and Architecture Discussion Stimulus." Jan. 2004. IEEE 802.21.

"Draft Supplement to Standard for Telecommunications and Information Exchange Between Systems—LAN/MAN Specific Requirements—Part 11: Wireless Medium Access Control (MAC) and physical layer (PHY) specifications: Medium Access Control (MAC) Enhancements for Quality of Service (QoS)." May 2002. IEEE Std 802.11e/D3.0.

Lin, Paul. "Proposed Problem and Scope Statements for Handoff ECSG." May 2003. IEEE P802 Handoff ECSG.

Das, Kaustubh. "Scope and Proposed Work Items for the Handoff Group." May 2003. IEEE P802 Handoff ECSG.

Gupta, Vivek. "Steps in L2 and L3 Handoffs." Jan. 2004. IEE P802 Handoff ECSG.

Arbaugh, William A. "Experimental Handoff Extension of RADIUS." Apr. 23, 2003.

Aboba, Bernard. "A Model for Context Transfer in IEEE 802." Apr. 6, 2002.

Marks, Roger. "Handoff Mechanisms and their Role in IEEE 802 Wireless Standards." Oct. 9, 2002. IEEE T802.16-02/03.

Lee, Young J. "IEEE P802.11 Wireless LANs: The Strategy for interworking between WLAN and cdma2000." Nov. 10, 2003. IEEE 802.11-00/xxx.

Lee, Young J. "An Strategy for interworking between WLAN and cdma2000." Nov. 2003. IEEE 802.11-00/xxx.

Shyy, Dong-Jye. "IEEE 802.21 WG—Suggested Architectures for Different Handover Scenarios." Mar. 2004. IEEE 802.21-04/xxxr0.

Johnston, David. "802.21 L2.5 Model." Mar. 2004. 802.21 L2.5 Option r1.

"Unlicensed Mobile Access (UMA); Architecture (Stage 2)." UMA Architecture (Stage 2) R1.0.2. (Nov. 3, 2004).

Wu, John Chiung-Shien et al. "Intelligent Handoff for Mobile Wireless Internet." 2001.

"$3^{rd}$ Generation Partnership Project; Technical Specification Group Services and System Aspects; 3GPP system to Wireless Local Area Network (WLAN) interworking; System description (Release 6)." 3GPP TS 23.234 V6.0.0 (Mar. 2004).

"$3^{rd}$ Generation Partnership Project; Technical Specification Group Services and System Aspects; 3GPP system to Wireless Local Area Network (WLAN) interworking; System description (Release 6)." 3GPP TS 23.234 V6.3.0 (Dec. 2004).

Endler et al., "General Approaches for Implementing Seamless Handover," Proceedings of the $2^{nd}$ International Workshop on Principles of Mobile Computing (2002).

Faccin, Stefano M. "IEEE 802.21 Media Independent Handover." Jan. 10, 2004. 21-04-0169-03-0000.

Floroiu et al., "Seamless Handover in Terrestrial Radio Networks: A Case Study," IEEE Communication Magazine, vol. 41 Issue 11, pp. 110-116 (Nov. 2003).

Lin, "QoS Aware Handover Scheme for the New Generation Wireless Networks," (Jul. 2002) available at http://thesis.lib.ncu.edu.tw/ETD-db/ETD-search/view_etd?URN=89522005 (last visited Aug. 21, 2008).

Sanmateu et al., "Seamless Mobility across IP Networks using Mobile IP," Computer Networks, vol. 40, pp. 181-190 (2002).

Toh, "The Design and Implementation of a Hybrid Handover Protocol for Multi-Media Wireless LANs," Proceedings of the $1^{st}$ Annual International Conference on Mobile Computing and Networking, pp. 49-61 (1995).

Williams, Michael Glenn. "IEEE P802 Wired and Wireless LANs Handoff: Tentative Minutes of the IEEE P802 Handoff Executive Committee Study Group." Jan. 13, 2004. 00-04-00XX-00-0000.

Williams, Michael Glenn. "IEEE P802 Wired and Wireless LANs Handoff: Tentative Minutes of the IEEE P802 Handoff Executive Committee Study Group." Jan. 14, 2004. 00-04-00XX-00-0000.

Williams, Michael Glenn. IEEE P802 Wired and Wireless LANs Handoff: Tentative Minutes of the IEEE.

Xhafa et al., "Reducing Handover Time in Heterogeneous Wireless Network," $58^{th}$ IEEE Vehicular Technology Conference, vol. 4, pp. 2222-2226 (2003).

Zhang et al., "Efficient mobility management for vertical handoff between WWAN and WLAN," IEEE Communications Magazine, vol. 41 Issue 11, pp. 102-108 (Nov. 2003).

Johnston, David. "802 Handoff Call for Interest — an Expression of Interest." Mar. 2003. IEEE 802-03/xxxr1.

* cited by examiner

US 7,710,923 B2

SYSTEM AND METHOD FOR IMPLEMENTING A MEDIA INDEPENDENT HANDOVER

CROSS REFERENCE TO RELATED APPLICATIONS

This application claims the benefit of U.S. Provisional Application No. 60/569,015, filed May 7, 2004, which is incorporated by reference as if fully set forth herein.

FIELD OF INVENTION

The present invention generally relates to wireless communication systems, and more particularly, to a method and system for implementing a media independent handover between different wireless network types.

BACKGROUND

Typical mobile systems have two main operating modes: Idle mode and Connected mode. In Idle mode, the station (STA) characteristics include: no user service (i.e., no call or transaction in progress); monitoring of paging channels; available service request channels; 100% of the receiver is available for downlink measurements of the radio environment; background coordination; and unscheduled access point (AP) and/or technology reselection. In Connected mode, the STA characteristics include: an active user service (e.g., a call is in progress); handover is possible; limited receiver availability for measurements (since the user service takes priority); and fully coordinated, scheduled AP and/or technology handover.

Prior to entering Idle mode (e.g., at power-up), the STA must perform selection in order to determine the best AP and technology available for the requested user service. While in the Idle mode, the STA continuously examines neighboring APs and APs with different technologies. Upon determination of a "better" AP, the STA will transition over (i.e., perform "reselection") to the new AP.

While in the Connected mode, a handover occurs upon transition from one AP to another AP offering "better" service, including switching to an AP using a different technology. In an ideal case, handover occurs without noticeable interruption of the active user service.

One goal is to achieve a seamless handover (i.e., to permit mobility of a STA) between different wireless network types, such as between different wireless local area network (WLAN) types or between a WLAN and a cellular system. Current technology does not provide for this type of handover.

FIG. 1 is a diagram of an existing cellular mobility model 100, showing a centralized radio resource management (RRM) approach to the mobility issue. A cellular STA 102 (e.g., a 2G mobile station or a 3G user equipment) is freely mobile among a plurality of APs 104. The APs 104 can include, but are not limited to, GSM base stations and FDD/CDMA Node Bs. The APs 104 are connected together via a radio network 106. A handover policy function (HPF) 108 is used to direct the handover of the STA 102 among the APs 104 as the STA 102 moves about. The HPF 108 is centrally located (e.g., in a 2G base station controller (BSC) or a 3G radio network controller (RNC)) and is connected to a network 110 (e.g., a switch or a server).

The HPF 108 provides coordination as the STA 102 moves about the different APs 104. The STA 102 sends measurements to the HPF 108, and the HPF 108 makes the final decision regarding handover and which AP 104 the STA 102 should be on.

In the model 100, semi-static frequency assignments are made to each AP 104 and some radio planning is required. In Idle mode, both intra-technology (e.g., GSM to GSM) and inter-technology (e.g., GSM to FDD/WCDMA) AP selection/reselection decisions are made in the STA 102 and are supported by system information (from the network 110) broadcast by the HPF 108. In Connected mode, AP handover decisions are made in the HPF 108 and are supported by measurements made by the STA 102 that are sent to the HPF 108 via L3 signaling.

FIG. 2 is a diagram of an existing WLAN mobility model 200, showing a distributed RRM approach to the mobility issue. An 802.x STA 202 is freely mobile among a plurality of APs 204, which can include, but are not limited to 802.11a and 802.16 APs. The APs 204 communicate via a radio network 206 and to a network 208 (e.g., a gateway or router).

In the model 200, dynamic frequency assignments are made to each AP 204 and radio planning is not required. The only type of handover supported in the mobility model 200 is an intra-technology (e.g., 802.11a to 802.11a) Idle mode handover, where the AP selection/reselection decision is made autonomously in the STA 202. The other handover types (Idle mode with inter-technology and Connected mode) are not supported in the mobility model 200.

In this distributed RRM approach, the APs 204 can be deployed anywhere and they dynamically manage themselves. There is no centralized point through which RRM is performed, and therefore, no element in the architecture to execute a handover.

FIG. 3 is a diagram of existing mobile system architectures for cellular and WLAN network types. A GPRS (2G) STA 300 includes a physical layer 302, a data link layer 304, and a network layer 306. The data link layer 304 includes a medium access control (MAC) sublayer 310 and a radio link control (RLC) sublayer 312. The network layer 306 includes a GSM radio resource (RR) manager 314, a mobility management (MM) protocol manager 316, and an Internet Protocol (IP)/convergence manager 318.

A 3GPP (3G) STA 320 includes a physical layer 322, a data link layer 324, and a network layer 326. The data link layer 324 includes a MAC sublayer 330 and a RLC sublayer 332. The network layer 326 includes a 3G RR controller 334, a MM protocol manager 336, and an IP/convergence manager 338.

An 802.xx STA 340 includes a physical layer 342, a data link layer 344, and a network layer 346. The data link layer 344 includes a MAC sublayer 350 and a logical link (LLC) sublayer 352. The network layer 346 includes a mobile IP manager 354 and an IP/convergence manager 356.

The RR manager/controller (314, 334) manages the instantaneous radio link, handling all of the information regarding a radio link. The MM protocol (316, 336, 354) handles network level issues, such as registration and location updating as the. STA moves about the system (i.e., issues outside of the call itself).

Current WLAN systems offer only a limited mobility capability. Intra-technology (e.g., 802.11 to 802.11) and inter-technology (e.g., 802.11 to 802.16) user transitions are supported using a "break before make" strategy that can be characterized as a reselection operation, as opposed to a handover operation in a typical full mobility system (e.g., GSM). This problem limits the growth of WLAN technologies, as this approach is unsatisfactory for supporting real time services such as voice and video streaming.

SUMMARY

The present invention is a solution to implement a full mobility solution for both intra-technology and inter-technology transition scenarios, and satisfies the requirements of both real time and non-real time services. The invention is a device-agnostic handover policy function that places few limitations on the physical implementation. The invention supports WLAN to WLAN transitions as well as WLAN to wireline LAN transitions and may be integrated with a typical mobile cellular system (e.g., GSM), allowing the realization of a full mobility WLAN/cellular solution.

A system for implementing a media independent handover in a station in a wireless communication system includes a physical sublayer management entity, a medium access control sublayer management entity, a management information base, and a handover policy function. The handover policy function is capable of receiving measurements and system information from the physical sublayer management entity, the medium access control sublayer management entity, and the management information base. The handover policy function is capable of then autonomously determining whether to execute a handover.

A system implements a media independent handover in a wireless communication system having a station and an access point. The station includes a physical sublayer management entity, a medium access control sublayer management entity, and a media independent handover (MIH) layer. The MIH layer communicates with the physical sublayer management entity and the medium access control sublayer management entity. The access point includes a handover policy function communicating with the MIH layer and determining whether the station should execute a handover.

A method for implementing a media independent handover in a station in a wireless communication system begins by providing a handover policy function. System measurements and information are provided from the station to the handover policy function. A determination whether to execute a handover is based on the system measurements and information.

A method for implementing a media independent handover in a wireless communication system begins by providing a media independent handover (MIH) layer in a station and a handover policy function in an access point. Station measurements are sent from the station to the access point via the MIH layer. The handover policy function determines whether the station should execute a handover. The handover is controlled via information sent via the MIH layer.

A station for implementing a media independent handover in a wireless communication system includes a physical sublayer management entity, a medium access control sublayer management entity, a management information base, and a handover policy function. The handover policy function is capable of receiving measurements and system information from the physical sublayer management entity, the medium access control sublayer management entity, and the management information base. The handover policy function is capable of then autonomously determining whether to execute a handover.

An integrated circuit for implementing a media independent handover in a station in a wireless communication system includes a physical sublayer management entity, a medium access control sublayer management entity, a management information base, and a handover policy function. The handover policy function is capable of receiving measurements and system information from the physical sublayer management entity, the medium access control sublayer management entity, and the management information base. The handover policy function is capable of then autonomously determining whether to execute a handover.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, the term "station" (STA) includes, but is not limited to, a wireless transmit/receive unit, a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

Figure 1:
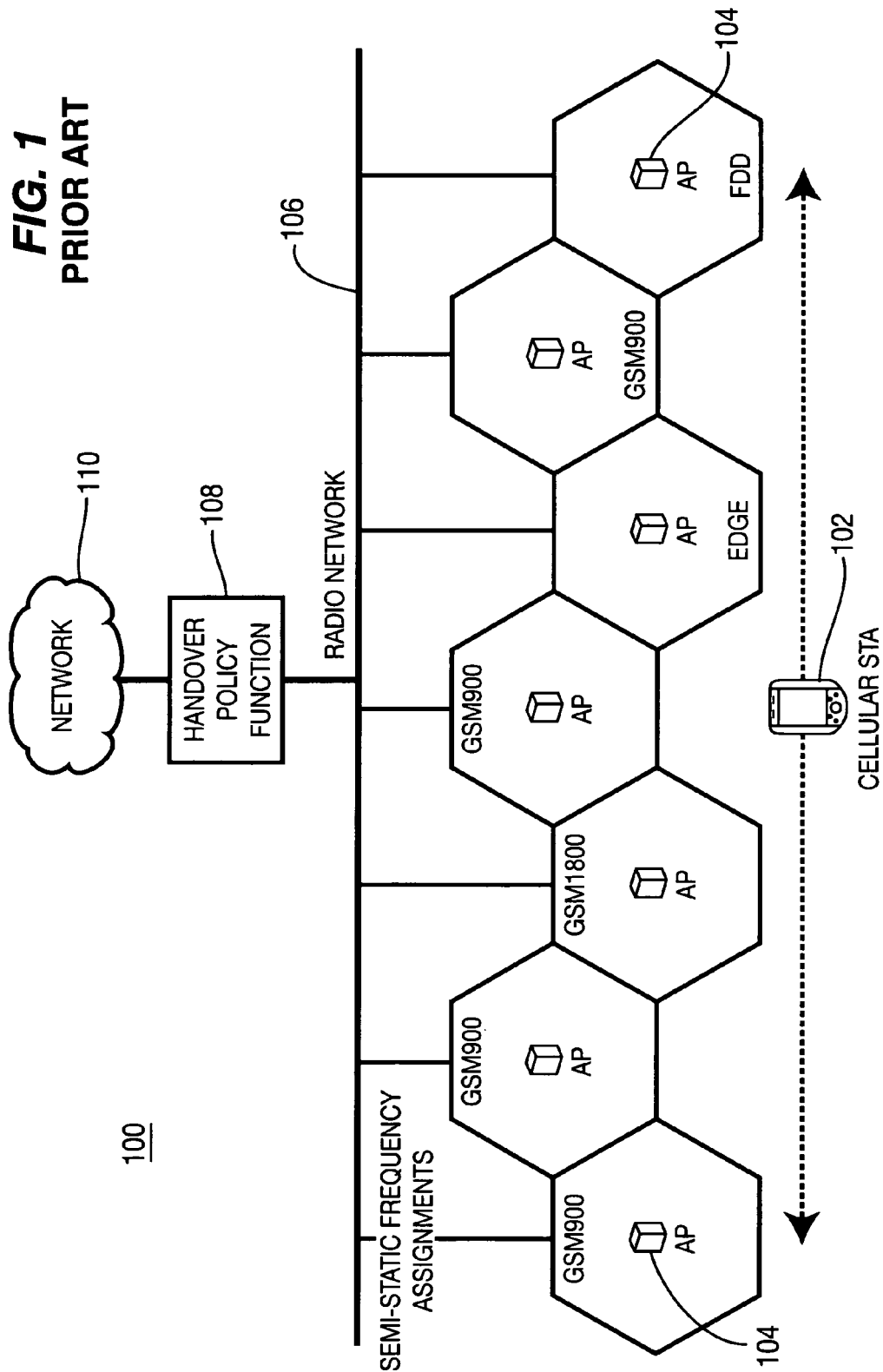
FIG. 1 is a diagram of an existing cellular mobility model.
Figure 2:
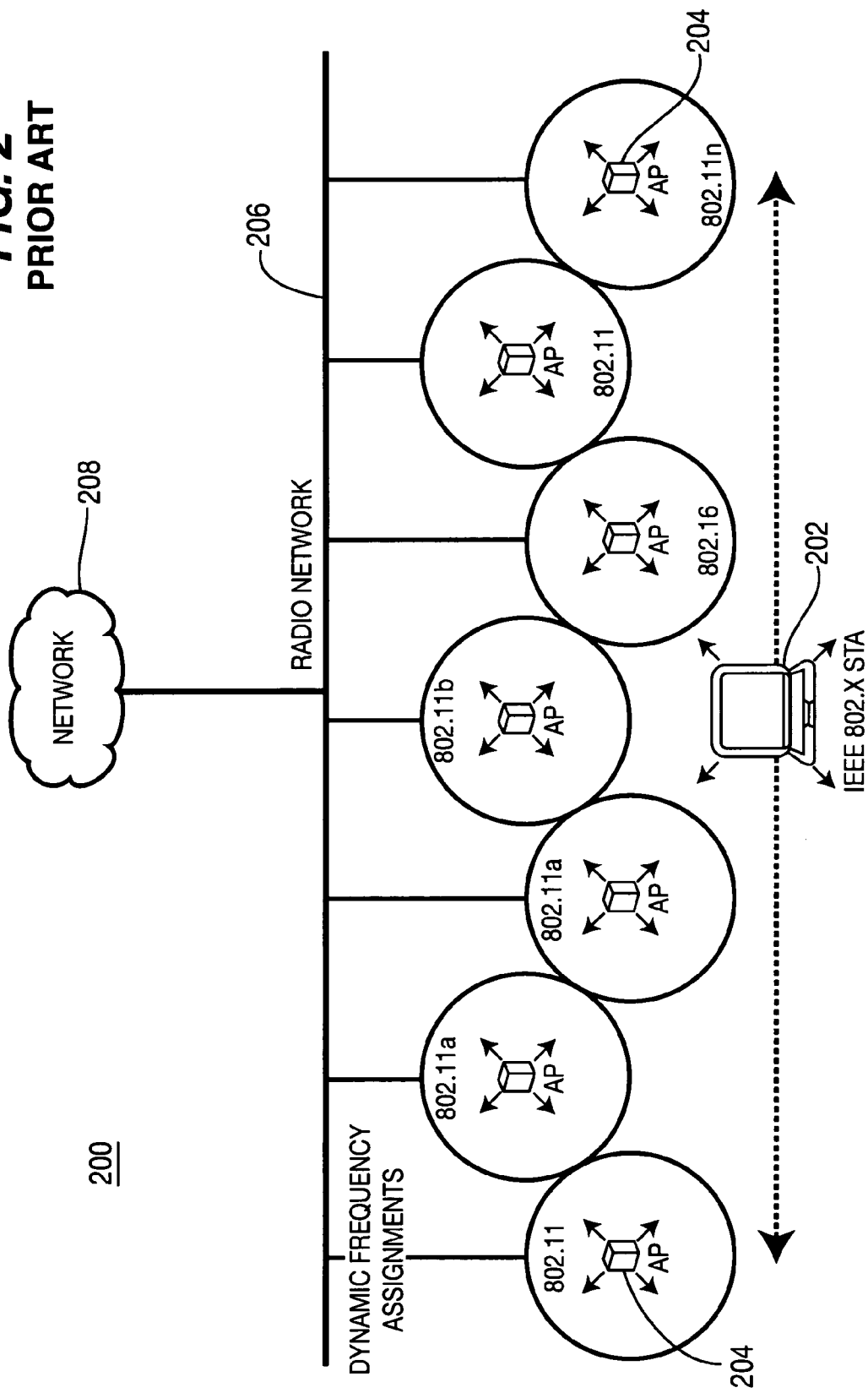
FIG. 2 is a diagram of an existing WLAN mobility model.
Figure 3:
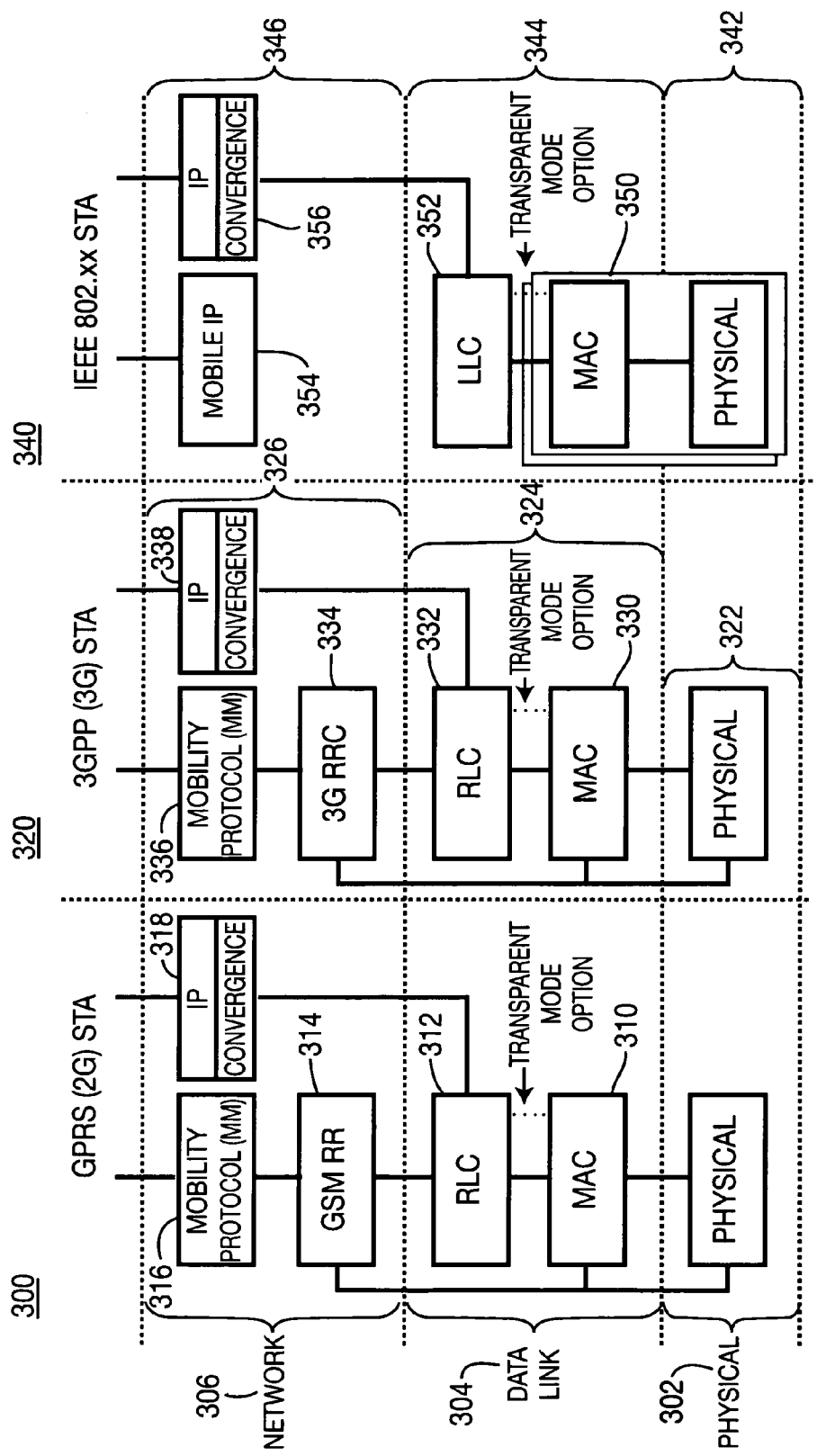
FIG. 3 is a diagram of existing mobile system architectures for cellular and WLAN network types.
Figure 4:
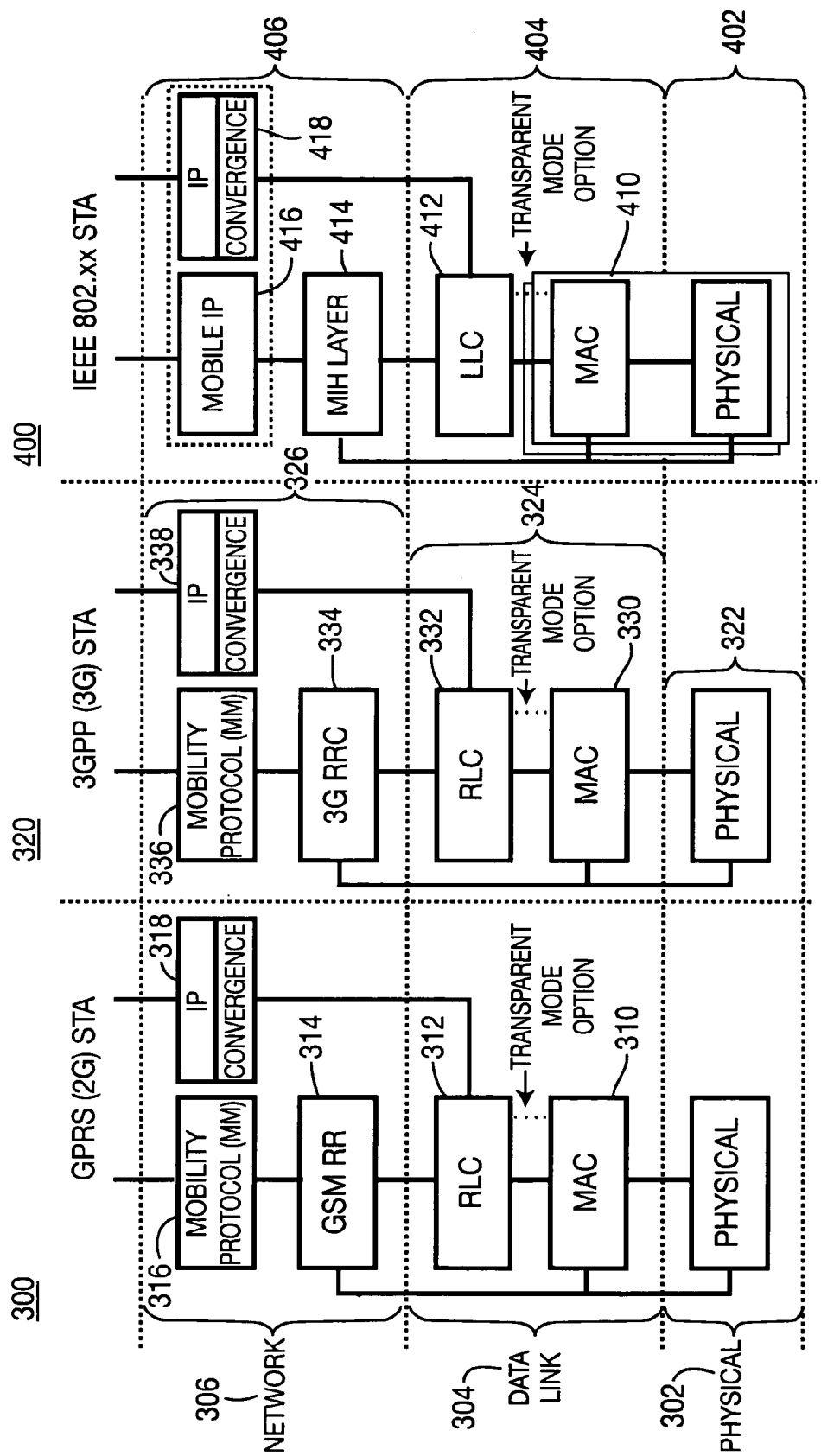
FIG. 4 is a diagram of a mobility architecture in a WLAN in accordance with the present invention and how it compares to cellular network types.

FIG. 4 is a diagram of a mobility architecture in a WLAN and how it compares to cellular network types. The GPRS STA 300 and the 3GPP STA 320 are identical to the STAs described above in connection with FIG. 3. An 802.xx STA 400 includes a physical layer 402, a data link layer 404, and a network layer 406. The data link layer 404 includes a MAC sublayer 410 and a LLC sublayer 412. The network layer 406 includes a media independent handover layer 414, a mobile IP manager 416, and an IP/convergence manager 418. The remainder of the discussion focuses on the media independent handover (MIH) layer 414 and how it operates within a mobility model. The MIH layer 414 performs functions similar to the GSM RR 314 and the 3G RRC 334.

Figure 5:
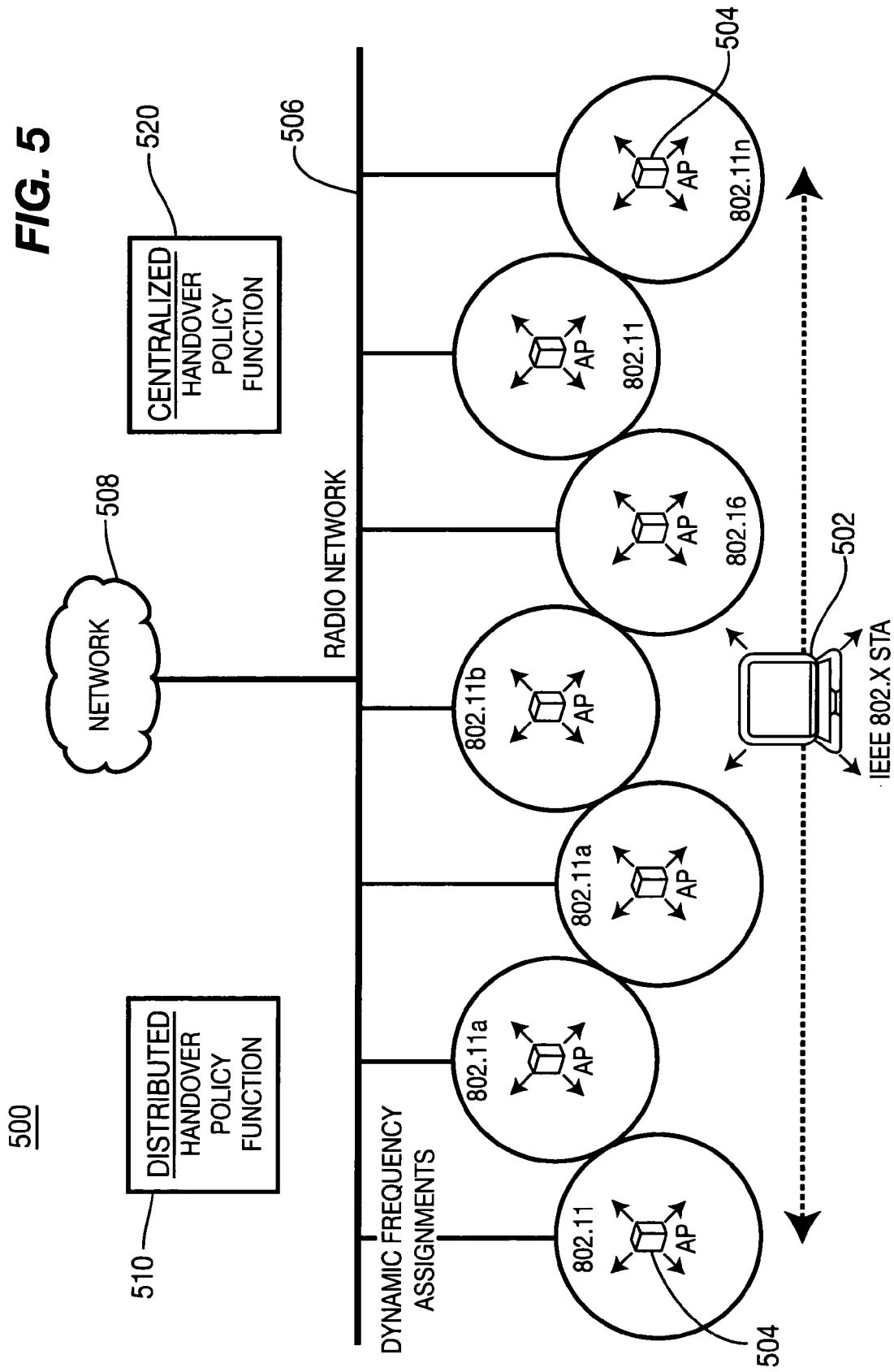
FIG. 5 is a diagram of a WLAN mobility model in accordance with the present invention.

FIG. 5 is a diagram of a WLAN mobility model 500 in accordance with the present invention, showing two basic HPF options, distributed and centralized. These options relate to the situations not previously addressed by mobility models, i.e., Idle mode with inter-technology handover and Connected mode handover.

An 802.x STA 502 is freely mobile among a plurality of APs 504, which can include, but are not limited to 802.11a and 802.16 APs. The APs 504 communicate via a radio network 506 and to a network 508 (e.g., a gateway or router).

The model 500 can implement a distributed HPF 510 at the STA 502 and/or a centralized HPF 520 at the network 508.

In a distributed HPF setting, the STA makes the selection, reselection, and handover decisions autonomously. This includes Idle mode, inter-technology selection/reselection and both Connected mode handover types.

In a centralized HPF setting, the HPF located on the system side assists in the selection and reselection processes, and makes the handover decisions supported by information gathered by the STA. The information is communicated from the STA to the HPF via the signaling mechanisms of the present invention (i.e., the MIH layer). This includes Idle mode, inter-technology selection/reselection and both Connected mode handover types.

Figure 6:
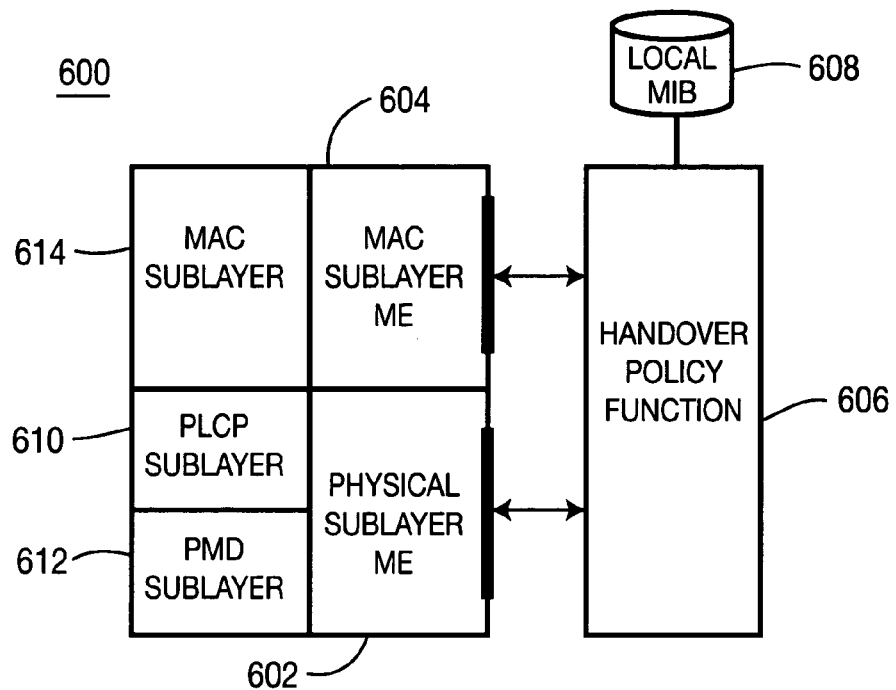
FIG. 6 is a diagram showing construction of a STA architecture to implement a distributed handover policy function of the present invention.

FIG. 6 is a block diagram of a functional architecture for a STA 600 utilizing the distributed HPF of the present invention. The STA 600 includes a physical sublayer management entity (ME) 602 and a MAC sublayer ME 604. A HPF 606 communicates with both the physical sublayer ME 602 and the MAC sublayer ME 604. A local management information base 608 stores information accessed by the HPF 606 in making the handover decision. The physical sublayer ME 602 includes a physical layer convergence procedure (PLCP) sublayer 610 and a physical medium dependant (PMD) sublayer 612. The MAC sublayer ME 604 includes a MAC sublayer 614.

Reselection and handover decisions are made autonomously by the STA. 600. The HPF 606 receives measurements and other events (information typically used in making a handover decision) from the MAC sublayer ME 604 and the physical sublayer ME 602. The HPF 606 processes this information and makes an autonomous decision whether to perform a handover.

This is a limited handover solution, and is really just an extension of the reselection procedure and would be characterized as such in a typical mobile system. This is an adequate, but sub-optimal solution, mainly due to the use of a "break then make" strategy. With this strategy, when a STA knows that its radio link is deteriorating, it breaks the current link or the link independently fails before the new link is established. The resource availability to complete the handover is not guaranteed, and could lead to dropped calls of the new AP lacks the resources to accommodate the handover. The possibility of dropped calls is an adequate solution for non-real time services, but is an unacceptable solution for real time services such as voice communications. Furthermore, this is a poorly scalable solution, for the same reasons; i.e., as more STAs are added to the system, the performance will deteriorate.

Figure 7:
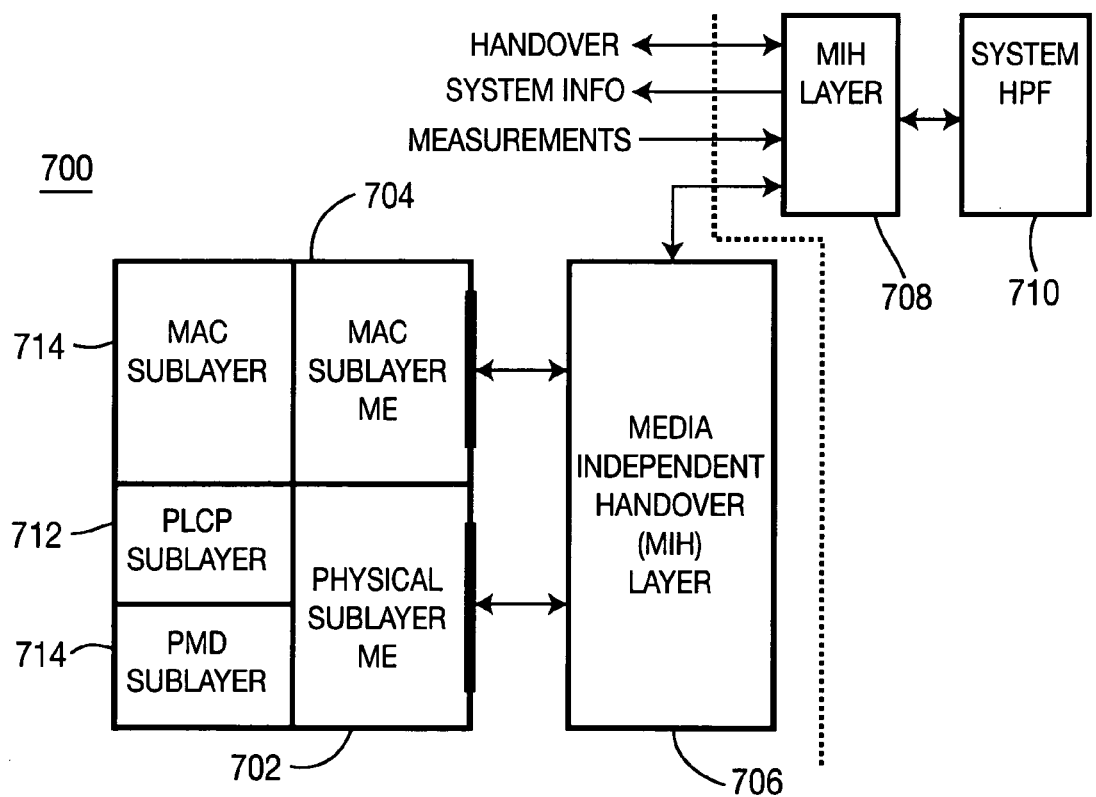
FIG. 7 is a diagram showing construction of a STA architecture to implement a centralized handover policy function of the present invention.

FIG. 7 is a block diagram of a functional architecture for a STA 700 utilizing the centralized HPF. The STA 700 includes a physical sublayer ME 702 and a MAC sublayer ME 704. A media independent handover (MIH) layer 706 communicates with both the physical sublayer ME 702 and the MAC sublayer ME 704. The MIH layer 706 communicates with a MIH layer 708 on the system side. The MIH layer 708 communicates with a system HPF 708. The physical sublayer ME 702 includes a PLCP sublayer 712 and a PMD-sublayer 714. The MAC sublayer ME 704 includes a MAC sublayer 716.

The MIH layer 706 and the system HPF 710 communicate via the MIH layer 708. The MIH layer 706 sends measurements to the HPF 710 and the HPF 710 sends system information to the MIH layer 706. The reselection and handover decisions are coordinated-between the MIH layer 706 and the HPF 710 based on this exchange of information. This use of both the MIH layer 706, the MIH layer 708, and the HPF 710 is analogous to a cellular system type of handover.

Reselection and handover decisions are coordinated by the HPF 710 and are supported by measurement reports and system signaling received via the MIH layers 706, 708. This is a fast, optimal handover solution due to the centralized decision-making which uses a make then break strategy, guaranteeing resource availability to complete the handover. This is an adequate solution for non-real time services, an acceptable solution for real time services, and is easily scalable, providing a full mobility solution.

In order to support a full mobility solution, both a mobility protocol (e.g., MM, mobile IP, SIP, etc.) and a resource control protocol (e.g., RRC or MIH layer) are required. The mobility protocol supports functions such as discovery, registration, tunneling, termination (or paging), handover at the network level (between two switches), and security. The resource control protocol supports functions such as system information, termination (or paging), cell selection/reselection, establishment, release, measurement reporting, power control, and handover at the radio level (between two radios). Handover support provided at both levels is required to support a full mobility solution.

On the network side, both the MIH layer 708 and the HPF 710 can be positioned in any centralized entity, such as an AP, a server, a database, or a router. In a preferred embodiment, the MIH layer 708 and the HPF 710 are located in an AP or an AP controller. The MIH layer 708 and the HPF 710 are separate logical entities. The MIH layer 708 acts as a state machine, gathering the necessary information and passing it to the HPF 710. The HPF 710 makes the handover decision based upon the information received.

While the present embodiment has been described in terms of a WLAN, the principles of the present embodiment are equally applicable to any type of wireless communication system. The centralized HPF architecture can be extended to support wireless to wired interworking scenarios, such as a handover policy when connecting a wireless device to a wireline system. An example of this would be using an 802.11-enabled laptop and then docking the laptop and using handover to take advantage of an Ethernet connection to the laptop docking station.

Although the elements shown in FIGS. 6 and 7 are illustrated as separate elements, these elements may be implemented on a single integrated circuit (IC), such as an application specific integrated circuit (ASIC), multiple ICs, discrete components, or a combination of discrete components and IC(s). In certain implementations, the functionality of embodiments and features of the invention may be present in discrete component(s)/IC(s) and may be partially/totally disabled or deactivated.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A wireless station comprising:
    a first transceiver configured to operate with an IEEE 802.xx compliant protocol stack;
    a second transceiver configured to operate with a second wireless communication protocol stack; and
    a processor operable with the first transceiver to communicate with an IEEE 802.xx communication network in combination with the IEEE 802.xx compliant protocol stack, wherein the IEEE 802.xx compliant protocol stack includes a physical (PHY) layer, a medium access control (MAC) layer, a media independent handover (MIH) layer, and a plurality of higher layers;
    the processor further operable with the second transceiver to communicate with a second wireless communication network in combination with the second wireless communication protocol stack, wherein the second wireless communication protocol stack includes a PHY layer, a MAC layer, a MIH layer, and a plurality of higher layers;

wherein the processor is further operable in combination with the MIH layer of the IEEE 802.xx compliant protocol stack and the MIH layer of the second wireless communication protocol stack to receive mobility management information from a handover policy function (HPF) of a network infrastructure component.

2. The wireless station of claim 1, wherein the processor is further operable to perform a handover from a first wireless network to a second wireless network in response to the mobility management information.

3. The wireless station of claim 2, wherein the first network is an IEEE 802.xx network and the second network is a cellular network.

4. The wireless station of claim 2, wherein the first network is an IEEE 802.xx network and the second network is an IEEE 802.xx network.

5. The wireless station of claim 4, wherein the first network is an IEEE 802.11 network and the second network is an IEEE 802.16 network.

* * * * *